(12) United States Patent
Rajaram

(10) Patent No.: US 8,290,924 B2
(45) Date of Patent: Oct. 16, 2012

(54) PROVIDING ANSWER TO KEYWORD BASED QUERY FROM NATURAL OWNER OF INFORMATION

(75) Inventor: Lalgudi Natarajan Rajaram, Chennai (IN)

(73) Assignee: Empire Technology Development LLC, Wilmington, DE (US)

( * ) Notice: Subject to any disclaimer, the term of this patent is extended or adjusted under 35 U.S.C. 154(b) by 301 days.

(21) Appl. No.: 12/504,684

(22) Filed: Jul. 17, 2009

(65) Prior Publication Data

US 2010/0057723 A1 Mar. 4, 2010

(30) Foreign Application Priority Data

Aug. 29, 2008 (IN) .......................... 2123/CHE/2008

(51) Int. Cl.
*G06F 7/00* (2006.01)

(52) U.S. Cl. ........ 707/706; 707/707; 707/711; 707/721; 707/737; 707/740; 707/741; 707/748; 707/767; 707/768

(58) Field of Classification Search .................. 707/706, 707/707, 711, 721, 737, 740, 741, 748, 767, 707/768
See application file for complete search history.

(56) References Cited

U.S. PATENT DOCUMENTS

| 7,606,809 | B2 * | 10/2009 | Soroca | ................................ 1/1 |
| 2007/0185841 | A1 * | 8/2007 | Jones et al. | ...................... 707/3 |
| 2009/0037412 | A1 * | 2/2009 | Bard et al. | ....................... 707/5 |

* cited by examiner

*Primary Examiner* — Etienne Leroux
*Assistant Examiner* — Cindy Nguyen
(74) *Attorney, Agent, or Firm* — Ren-Sheng International

(57) ABSTRACT

A type of search engine (referred to as the "Get Engine") receives one or more keywords, semantically formulates a question being asked from the keywords, generates specifications for the query, and searches a website index to determine websites that are likely owners of the answer to the question based on the query specifications and website classifications. The Get Engine determines a website that is most likely the owner of the answer based on credibility, searches the pages of the website using the keywords and additional keywords related to the query, retrieves the answer from the pages of the website, and receives feedback used in part to determine the credibility of the website.

20 Claims, 7 Drawing Sheets

800 A computer program product.

804 at least one of one or more instructions for saving, in a first database, website classifications of websites based on contents;

one or more instructions for receiving keywords;

one or more instructions for determining specifications of the query from the keywords;

one or more instructions for determining a group of websites that may own an answer to the query based on the query specifications and the website classifications saved in the first database;

one or more instructions for selecting a website from the group based on credibility of the websites saved in a second database;

one or more instructions for searching web pages of the website for the answer;

one or more instructions for selecting the answer from the web pages; and one or more instructions for transmitting the answer.

806 a computer-readable medium 808 a recordable medium

FIG. 8

PROVIDING ANSWER TO KEYWORD BASED QUERY FROM NATURAL OWNER OF INFORMATION

CROSS-REFERENCE TO RELATED APPLICATIONS

This application claims priority to Indian Patent Application 2123/CHE/2008, filed on Aug. 29, 2008.

BACKGROUND

Description of the Related Art

Unless otherwise indicated herein, the approaches described in this section are not prior art to the claims in this application and are not admitted to be prior art by inclusion in this section.

Search engines like Google and Yahoo are well known. Given a set of keywords, a search engine retrieves from the web all pages that contain the keywords and orders them according to a page rank algorithm. It presents the list of page references to the viewer in the order of page rankings. The page rank algorithm takes into account the number of references that point to the page as well as the number of high ranging pages that this page itself refers to. This leads to "search engine optimizing" techniques on the part of individual website to get favorable page ranks. The Search Engine thus caters to the 'researcher' who wants to 'study' a particular topic characterized by the set of keywords by accessing the sites that may contain the relevant information.

There are a few "answer" services such as Answer.com, Just Dial, Google Local (Beta version) that provide answers to a limited set of questions. Many of these services are human assisted and promise to get back through email with answers. Some are automated to a limited extent where they answer out of a well maintained database. They have a database of frequently asked questions (FAQs) as well as a database of answers, and they first retrieve the closest question that matches with the one submitted and then check with the stored answers to those questions. They continuously update their database by encouraging people visiting their sites to provide answers to existing questions, thereby enriching the database with new types of answers to the same question and checking with the person asking the query with new answers.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8 is a block diagram illustrating a computer program product of the Get Engine in one embodiment of the disclosure.

Use of the same reference numbers in different figures indicates similar or identical elements.

DETAILED DESCRIPTION

Figure 1A:
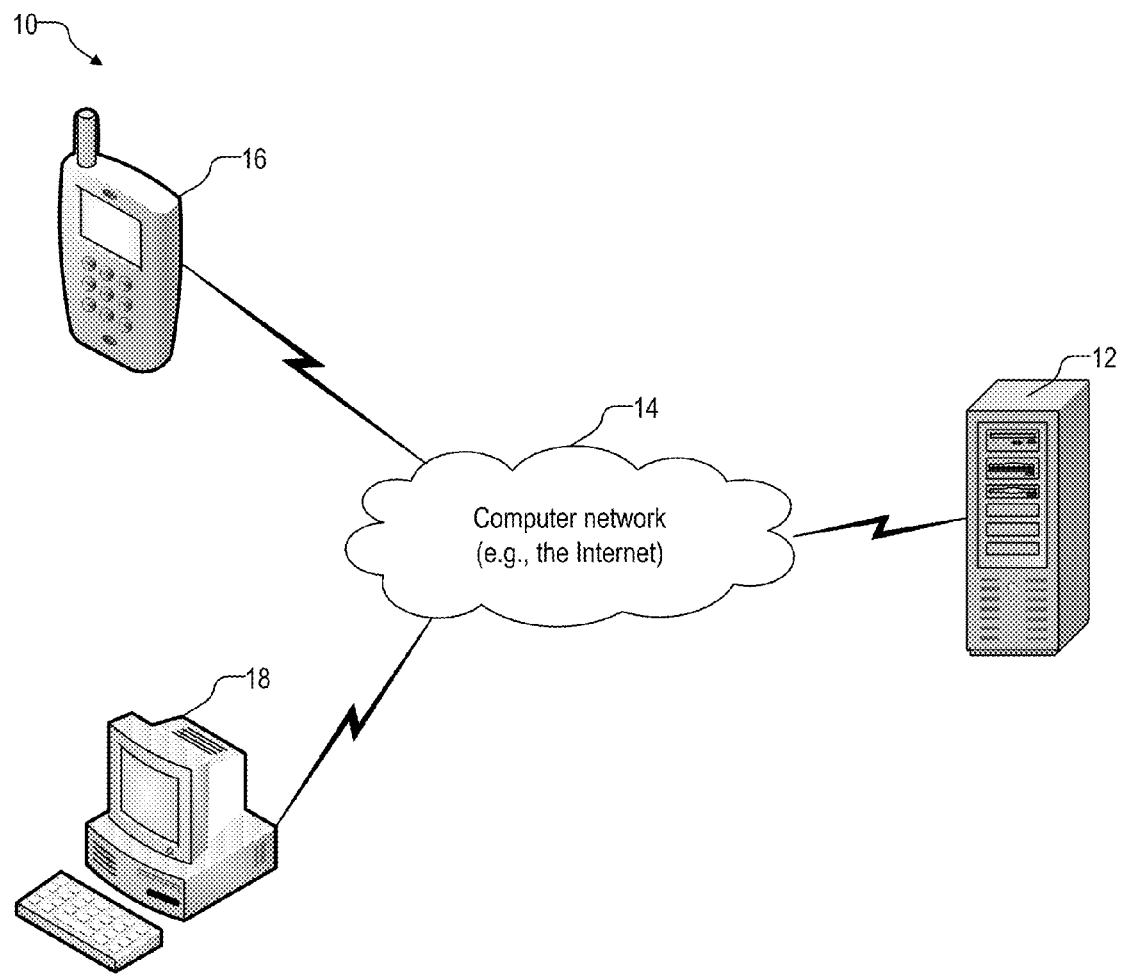
FIG. 1A illustrates an operating environment for a type of search engine (hereafter the "Get Engine") in one embodiment of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to answering queries.

The problem with the search engine techniques is that it does not cater to a person's simple query that has one or a set of definitive answers and the person is not aware of the website where this information is available. Examples of a simple query includes "When was Tendulkar's debut and what was his score?", "What is the scheduled arrival time of Jet Airways flight from Bangalore that arrives in the evening after 7.00 pm?", and "What is the atomic weight of carbon?".

While these answers can be obtained by the use of search engines like Google, the process is laborious and sometimes futile. The phrase "atomic weight carbon" when submitted to a search engine returns 2,040,000 URL references in 0.29 seconds of which except for the first 7 or 8 on the first page are probably never read, thereby rendering all that technology useless. The first reference of the results points to a Wikipedia page. When clicked and retrieved, the Wikipedia page comes up with verbose text about atomic mass, atomic weights, Avogadro's number, etc. The eager eyes do not see "carbon" anywhere there. When the "find on this page" option is used to find "carbon," a highlight appears on the word carbon deep down on the scrolled up page. Fortunately it is followed by a number 12 after a hyphen. Further scrolling throws up a periodic table and there the letter C in a block has 12 included in it. Imagine going through all this while triggering a search engine by entering the keywords on a cell phone browser while waiting at the airport. As one can see, the "search engine" is actually for researchers with skills in searching for what they "think" they are looking for in an unstructured mass of data available on the World Wide Web.

Embodiments of the disclosure provide a type of search engine (hereafter the "Get Engine") that gives straight and simple answers to simple questions from any credible website. The specific website that provides the answer is not important as long as its credulity is assured.

FIG. 1A illustrates an operating environment 10 for the Get Engine in one embodiment of the disclosure. The Get Engine is implemented as software on a server computer 12. Server computer 12 includes a nonvolatile memory storing the software codes and the databases of the Get Engine, a volatile memory into which instructions and data from the software codes and the databases may be loaded, and a processor executing the instructions and processing the data in the volatile memory. Server computer 12 is coupled to a computer network 14. Devices such as a mobile phone 16 and a personal computer 18 uses their browsers to access the Get Engine on server computer 12 through computer network 14.

Figure 1B:
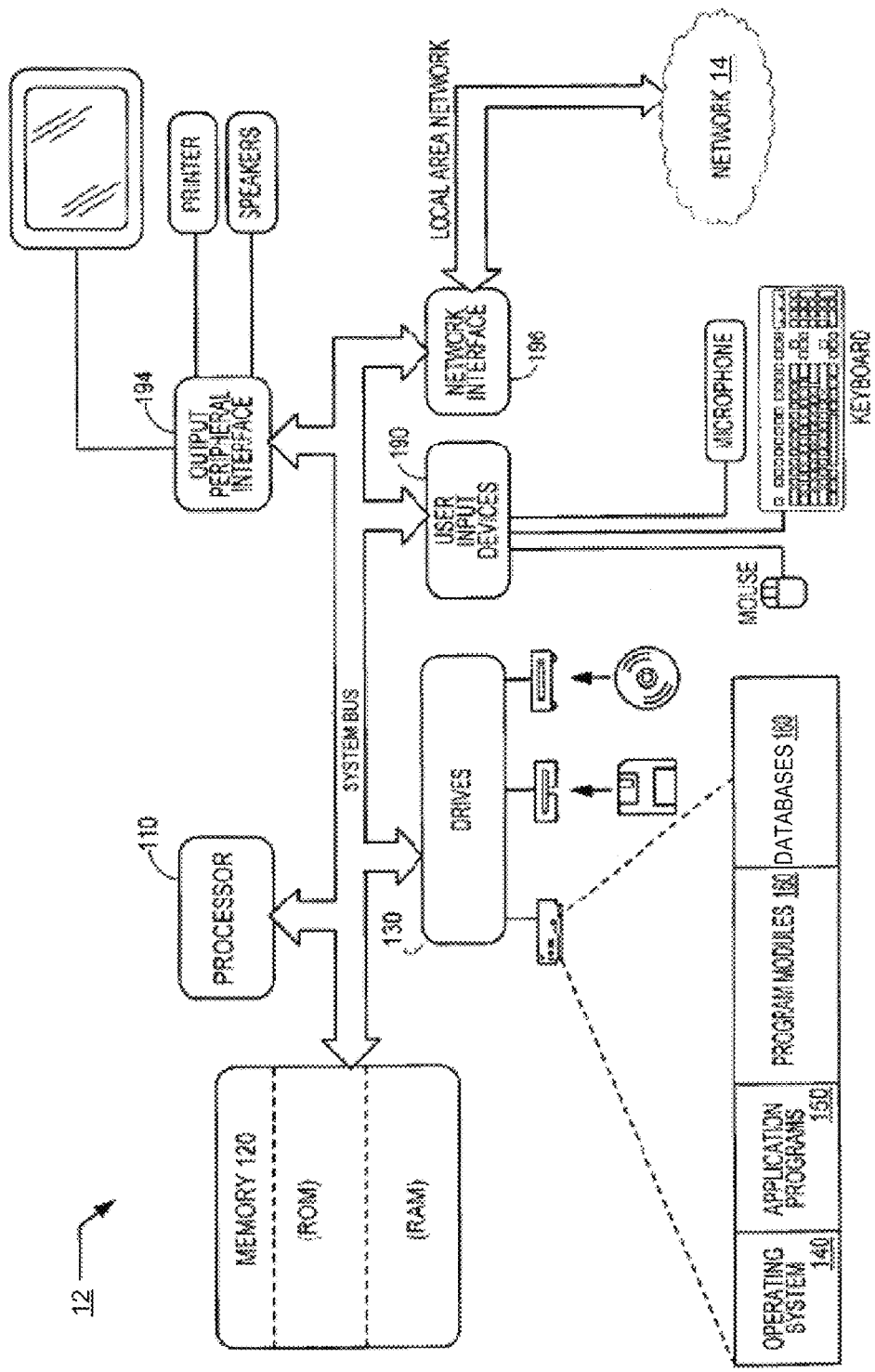
FIG. 1B illustrates a server computer for implementing the Get Engine in one embodiment of the disclosure.

With reference to FIG. 1B, depicted is an exemplary server computer 12 for implementing embodiments of the Get Engine. Server computer 12 includes a processor 110, memory 120 and one or more drives 130. The drives 130 and their associated computer storage media, provide storage of computer readable instructions, data structures, program modules and other data for server computer 12. Drives 130 can include an operating system 140, application programs 150, program modules 160, and database 180. Server computer 12 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as server computer 12 may also include other peripheral output devices such as speakers, which may be connected through an output peripheral interface 194 or the like.

Server computer 12 may operate in a networked environment using logical connections to one or more computers, such as a remote computer connected to a network interface 196. The remote computer may be a personal computer, a server, a router, a network PC, a mobile phone, a peer device, or other common network node, and can include many or all of the elements described above relative to server computer 12. Networking environments are commonplace in offices, enterprise-wide area networks (WAN), local area networks (LAN), intranets and the Internet. For example, in the subject matter of the present application, server computer 12 may comprise the source machine from which data is being migrated, and the remote computer may comprise the destination machine or vice versa. Note however, that source and destination machines need not be connected by a network 14 or any other means, but instead, data may be migrated via any media capable of being written by the source platform and read by the destination platform or platforms. When used in a LAN or WLAN networking environment, server computer 12 is connected to the LAN through network interface 196 or an adapter. When used in a WAN networking environment, server computer 12 typically includes a modem or other means for establishing communications over the WAN, such as the Internet or network 14 It will be appreciated that other means of establishing a communications link between the computers may be used.

According to one embodiment, server computer 12 is connected in a networking environment such that the processor 110 and/or program modules 160 can perform with or as the Get Engine in accordance with embodiments herein.

Figure 2:
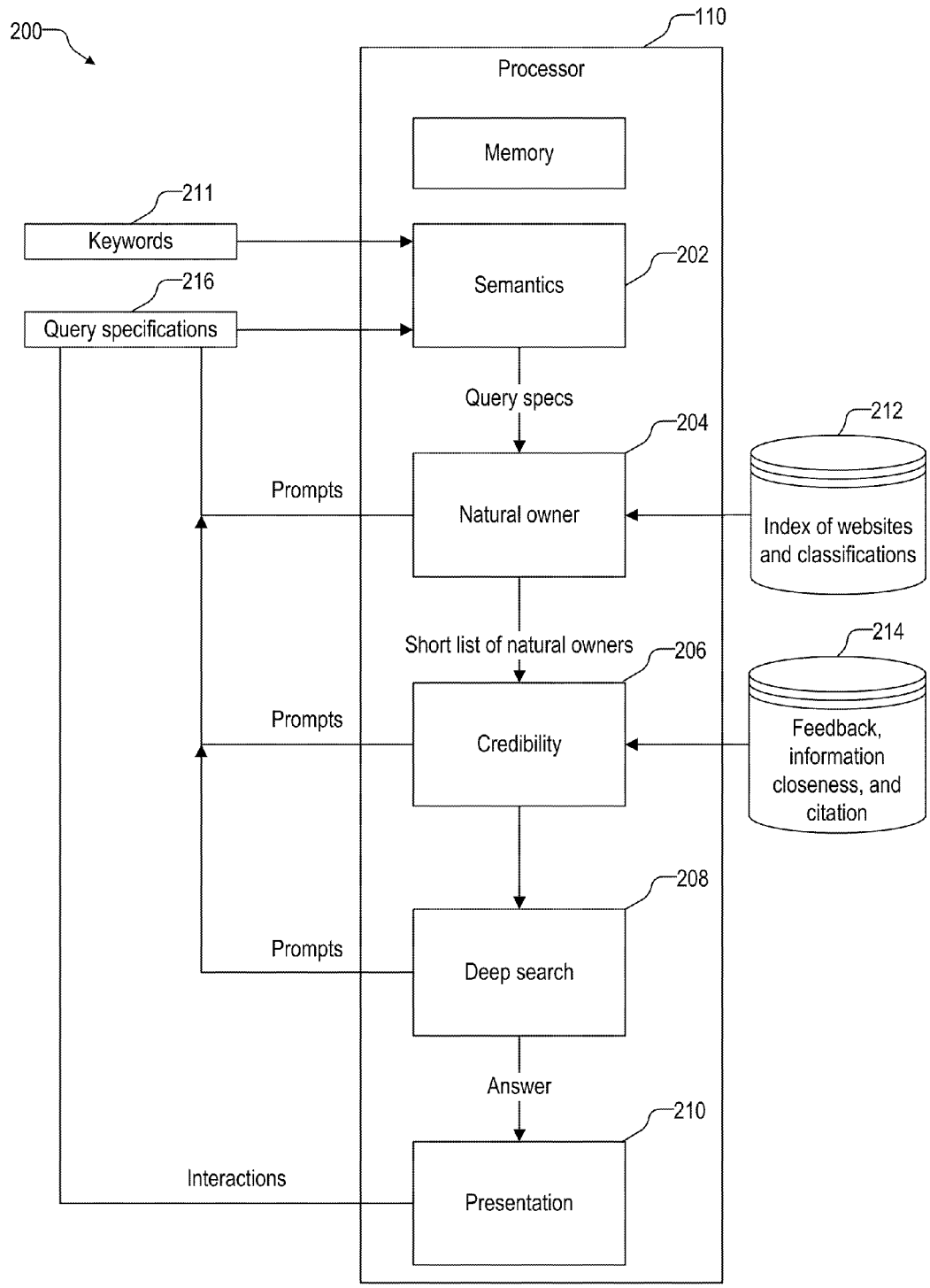
FIG. 2 is a block diagram of software modules in the Get Engine in one embodiment of the disclosure.

FIG. 2 is a block diagram illustrating the software modules and the databases of the Get Engine 200 executed by processor 110 in one embodiment of the disclosure. Get Engine 200 includes a semantics module 202, a natural owner module 204, a credibility module 206, a deep search module 208, and a presentation module 210. In one implementation, the instructions for each of the modules described above are stored in a memory unit and are executed by processor 110. Semantics module 202 receives one or more keywords 211. Based on keywords 211, semantics module 202 formulates semantically the question being asked and generates query specifications. Based on the query specifications, natural owner module 204 searches a website index database 212 to determine a shortlist of websites that are likely owners of the answer to the question (i.e., likely to have a web page containing the answer). From the shortlist of natural owners and rankings in a credibility database 214, credibility module 206 determines a website that is the most likely owner of the answer to the question. Deep search module 208 then searches the pages of the website and retrieves the answer. Presentation module 210 presents the answer succinctly obtains feedback on the accuracy of the answer. Any of the other modules may prompt for additional information to refine the query specifications 216. The details of the modules are explained hereafter.

Figure 3:
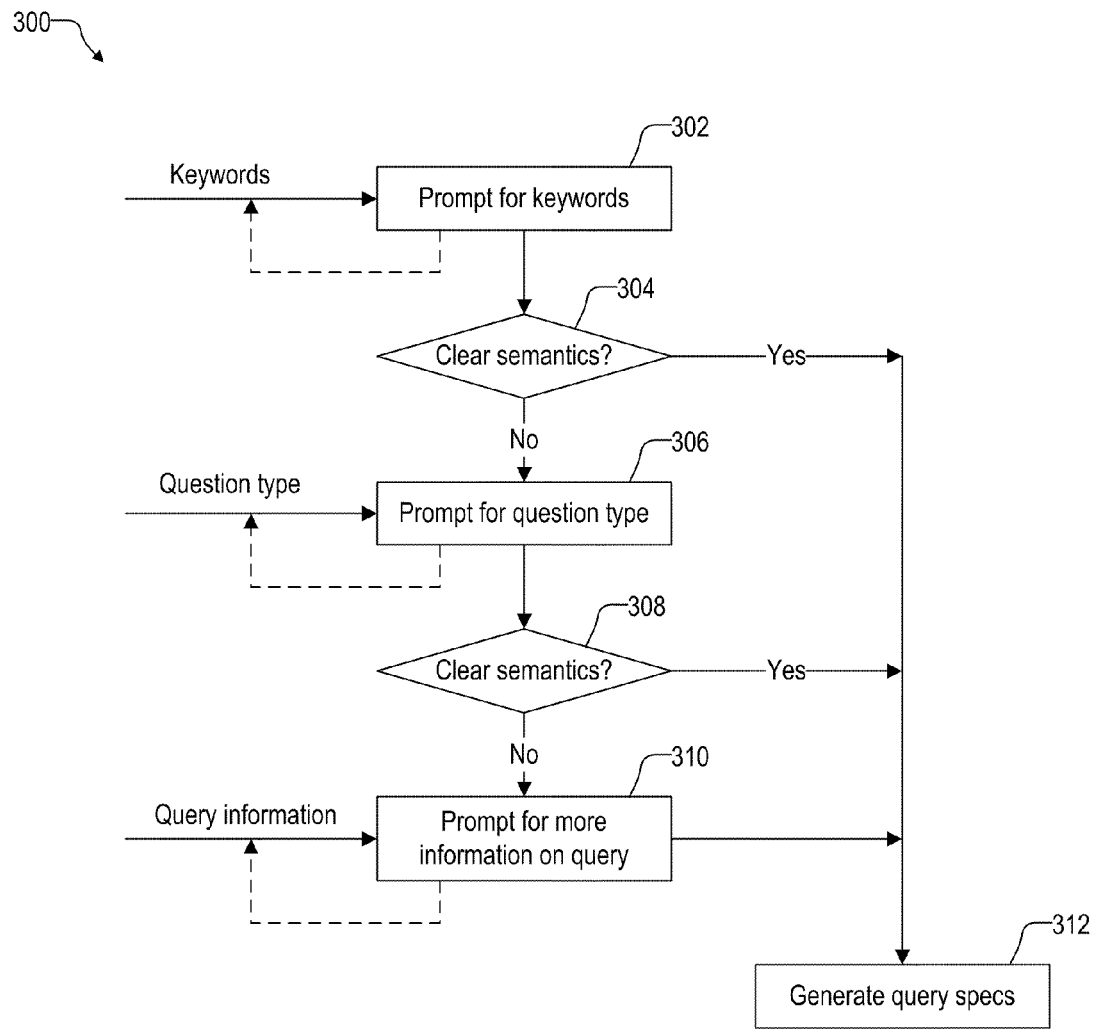
FIG. 3 is a flowchart of a method performed by a semantics module in the Get Engine in one embodiment of the disclosure.

FIG. 3 is a flowchart of a method 300 for semantics module 202 in one embodiment of the disclosure. In step 302, semantics module 202 receives one or more keywords and attempts to determine the question being asked based on the semantics of the keywords. Semantics module 202 applies natural language processing, linguistics, and cognitive psychology principles to determine the question being asked. For example, assuming the keywords are "atomic weight carbon," semantics module 202 determines the question being asked is "What is the atomic weight of carbon?".

Semantics module 202 may repeatedly prompt for additional keywords to better formulate the question being asked. Semantics module 202 may also formulate multiple candidate questions and ask for a selection of one of candidate questions. For example, assuming the keywords are "atomic weight carbon," semantics module 202 determines the candidate questions include "What is the atomic weight of carbon?", "What is meant by atomic weight of carbon?", and "Where can I find the atomic weight of carbon?". Step 302 is followed by step 304.

In step 304, semantics module 202 determines if the semantics of the keywords is clear so that the question being asked can be determined. If so, then step 304 is followed by step 312. If the semantics is not clear, then step 304 is followed by step 306.

In step 306, semantics module 202 prompts for the question type. For example, semantics module 202 prompts for a selection of one or more of the following question types: who, what, when, where, why, and how. Semantics module 202 may repeatedly prompt for question types to better formulate the question being asked. Semantics module 202 may also formulate multiple candidate questions and ask for a confirmation that one of candidate questions is correct. Step 306 is followed by step 308.

In step 308, semantics module 202 again determines if the semantics of the keywords is clear so the question being asked can be determined. If so, then step 309 is followed by step 312. If the semantics is not clear, then step 308 is followed by step 310.

In step 310, semantics module 202 prompts for more information regarding the question being asked and then formulates the question being asked. The information being prompted helps to determine website classifications of websites that would contain the answer to the question being asked. Examples of website classifications are described later in a table. For example, semantic module 202 asks the following questions: "Is the information needed static or dynamic?", "Is the information specific to an entity and if so what is the entity type?", "Is the information a fact, an estimate, news?", "Is the answer a time, a price, or some other measure?", and "Is the information location specific?". Semantics module 202 may repeatedly prompt for additional information to better formulate the question being asked. Step 310 is followed by step 312.

In step 312, semantics module 202 applies a set of rules to translate words in the question being asked into query specifications. The query specifications are website classifications of websites that would contain the answer to the question being asked. For example, assuming the question is "What is the expected arrival time of flight 200 at JFK?", semantics module 202 determines the query specifications are (1) information type—dynamic time data, (2) sector type—transportation, and (3) location specificity—city. Examples of website classifications are described later in a table.

Figure 4:
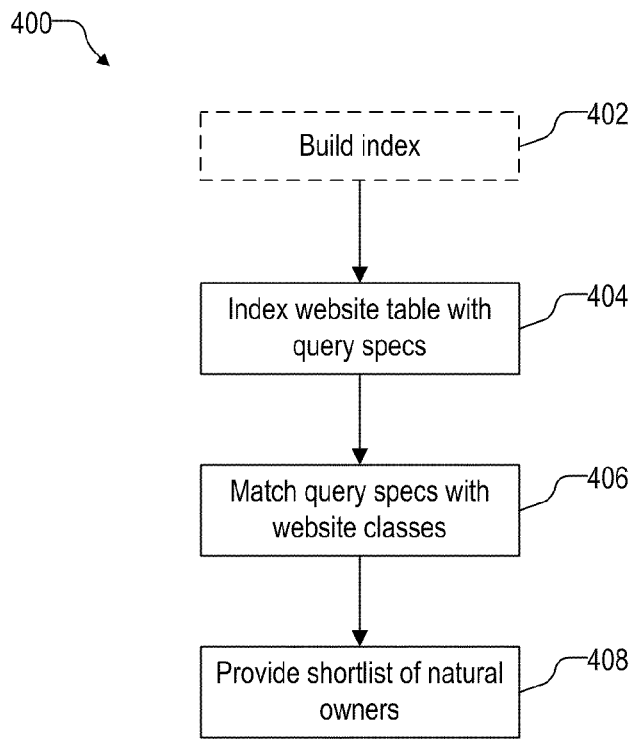
FIG. 4 is a flowchart of a method performed by a natural owner module in the Get Engine in one embodiment of the disclosure.

FIG. 4 is a flowchart of a method 400 for natural owner module 204 in one embodiment of the disclosure. FIG. 4 also includes a step 402 that can be performed by a human or by natural owner module 204 in one embodiment of the disclosure. In step 402, a human or natural owner module 204 builds an index of websites with their website classifications and saves it in database 212. Each website may belong to one or more website classifications. The website classifications of a website can be proportionally weighted according to the contents of the website. For each classification type, the web sites will have weighted scores for each classification listed. For example, the American Airlines website has published facts about the company, about flight schedules, high predominance of time critical data about flights, and predominance of dynamic data regarding prices. Hence weights for the classification type of this website, on the scale of 1 to 10 may be as follows: published facts—4, dynamic time data—8, dynamic price data—8, time estimates—5 and so on.

In one embodiment of the disclosure, human initially builds the website index by manually visiting websites and classifying them accordingly, and causes natural owner module 204 to save the website index in database 212. Natural owner module 204 then continues this process by automatically visiting websites, parsing their pages, and classifying them accordingly. For example, natural owner module 204 may include a search engine that performs the automatic website classification. The result of the automatic website classification may be verified by human. As Get Engine 200 gains acceptance, websites may start to classify themselves according to the classification system of the Get Engine and submit their classifications to server 102 so they actively participate in Get Engine searches. The following table illustrates exemplary website classification types and classifications.

TABLE

| Classification Types | Classifications |
| --- | --- |
| Entity type | Private company, non-profit, government, academic, public organization |
| Service type | Published company information, published general information, published academic |

TABLE-continued

| Classification Types | Classifications |
| --- | --- |
| | information, interactive service provider, interactive trading, interactive commerce, social relationship site |
| Information type | Published facts, published estimates, news, dynamic (e.g., time critical) time data, dynamic price data, dynamic quantity data |
| Sector type | Transportation, education, healthcare, technology, geography, religion |
| Location specificity | Global, country, state, city, neighborhood, family, personal |
| Time period specificity | Current (e.g., within 1 day), recent past (e.g., 1 year), past (e.g., 50 years), distant past (e.g., 200 years), ancient (e.g., greater than 200 years), immediate future (e.g., 7 days), future (e.g., 1 year), distant future (e.g., 20 years), remote future (100 years) |

As part of step 402, natural owner module 204 also determines and records the names of the other websites linked to a website in database 214. As explained later, the number of other natural owner websites linked to a natural owner website is used as an indication to rank the natural owner websites according to their credibility.

In step 404, natural owner module 204 takes the query specifications from semantics module 202 and matches them with the corresponding website classifications.

In step 406, natural owner module 204 searches for websites having at least one of the corresponding website classifications with a weight over a threshold. The threshold is used to ensure the website is mainly related to the question being asked.

In step 408, natural owner module 204 provides a shortlist of "N" number of the matching websites (where N is a variable) that are considered natural owner websites likely to have the answer to the question. Natural owner module 204 can adjust the value of N depending on the credibility of the matching websites. If the matching websites have relatively high credibility, then the value of N may be reduced. If the matching websites have relatively low credibility, then the value of N may be increased. If natural owner module 204 cannot find any matching websites, it may ask semantics module 202 to re-determine the query specifications.

Figure 5:
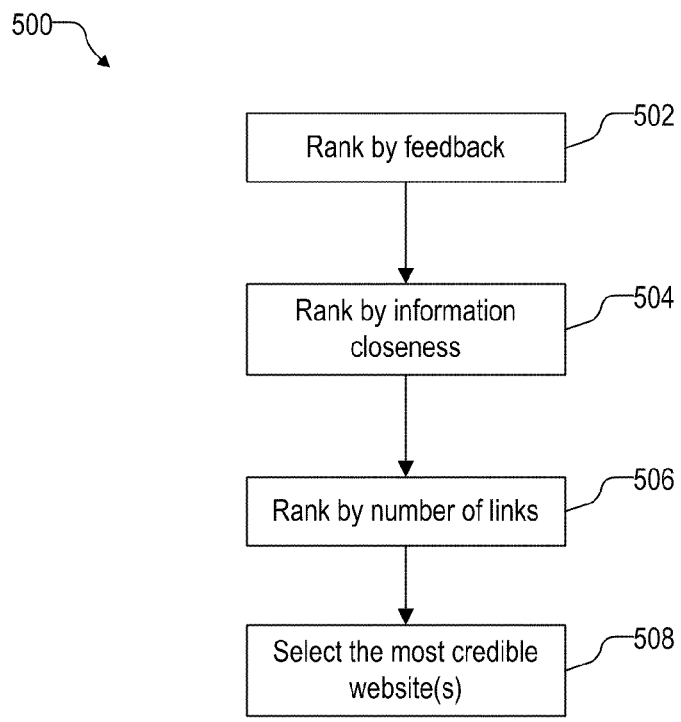
FIG. 5 is a flowchart of a method performed by a credibility module in the Get Engine in one embodiment of the disclosure.

FIG. 5 is a flowchart of a method 500 for credibility module 206 in one embodiment of the disclosure. Credibility module 206 ranks the natural owner websites in the shortlist provided by natural owner module 204 according to user feedback, information closeness, and links from other natural owners to a specific natural owner. In step 502, credibility module 206 ranks the websites in the shortlist by feedback values of those websites, which are stored in database 214. As will be described later, a feedback value for a website is received after presenting the answer from the website and saved in database 214.

In step 504, credibility module 206 ranks the websites in the shortlist by information closeness of those websites stored in database 214. As will be described later, the information closeness value for a website is determined by comparing the answer found in that website to the answers found in other websites in the shortlist of a previous query.

In step 506, credibility module 206 ranks each website in the shortlist by the numbers of links from other natural owner websites in the shortlist to that website from the information in database 214. As described earlier, natural owner module 204 determines and records the names of the websites lined to each website in database 214. Based on that information, credibility module 206 determines, for each website in the shortlist, how many other websites in the shortlist are linked to that website.

In step 508, credibility module 206 selects a website in the shortlist that has the highest combination of the different types of credibility rankings. Alternatively, credibility module 206 presents the top ranking websites from the different types of credibility rankings and prompts a selection from the top ranking websites.

Figure 6:
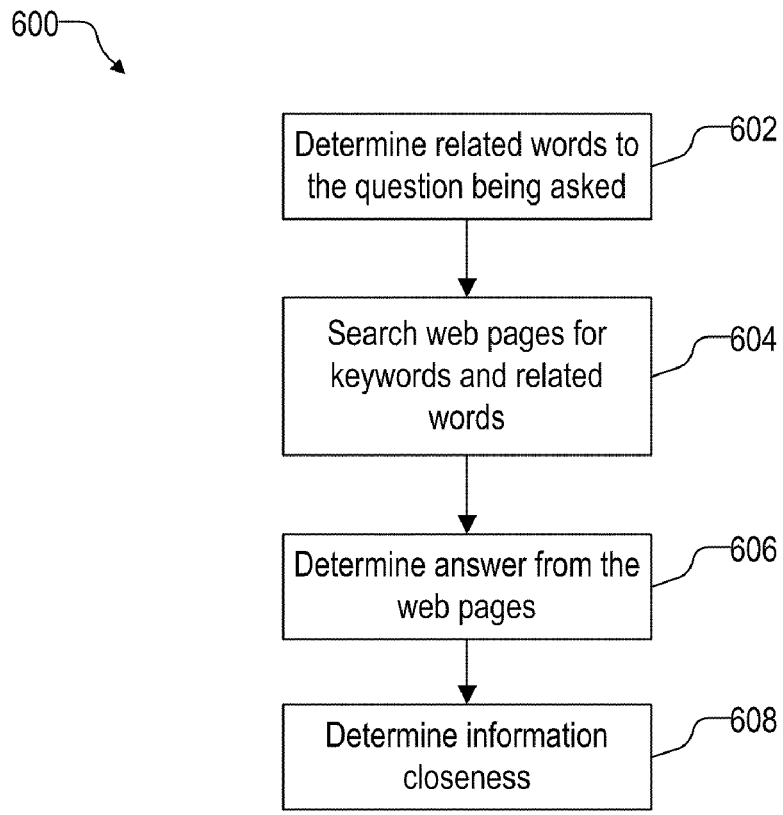
FIG. 6 is a flowchart of a method performed by a deep search module in the Get Engine in one embodiment of the disclosure.

FIG. 6 is a flowchart of a method 600 for deep search module 208 in one embodiment of the disclosure. In step 602, deep search module 208 determines additional words related to the question being asked. For example, if the question is of a "why" type, then the additional words includes "reason," "causes," "because," and "therefore." If the question is of a "how" type, then the additional words include "the way," "method," "process," "before," "after," "sequence," and "steps."

In step 604, deep search module 208 searches the pages of the top ranking website for the keywords and the related words. Deep search module 208 may use a search engine to find the pages most relevant to the keywords and the related words.

In step 606, deep search module 208 determines the answer to the question being asked from the most relevant pages. As the question being asked has been determined, deep search module 208 applies natural language processing, linguistics, and cognitive psychology principles to determine the semantics of the answer based on the question and the query specifications. Deep search module 208 then searches for the answer on the most relevant pages. For example, assuming the question is "What is the atomic weight of carbon?", deep search module 208 determines the answer includes "The atomic weight of carbon is" and searches for the answer on the most relevant pages.

In step 608, deep search module 208 determines the information closeness value for each of the natural owner websites in the shortlist, and records them or averages of the information closeness values (e.g., a running average, a moving average, a weighted moving average, or an exponential weight moving average) in database 214. First, deep search module 208 determines the answers from the other natural owner websites in the shortlist. For a query that returns a numeric answer, the variance of an answer of a natural owner website in the shortlist from the line of regression determined statistically from the answers of all the natural owner websites in the shortlist is used to provide the information closeness value for that website. For a query that returns a non-numeric answer, syntactic closeness is determined to the natural owner website that is "closest" to the most number of other natural owner websites and given scores accordingly. If the 'closeness' score of the natural owner websites appear too disparate, then a cluster analysis is done to see if they form different clusters. In that case, the information closeness values are provided separately to each cluster. The information closeness values of the websites are used to rank the credibility of those websites in subsequent searches for an answer.

Figure 7:
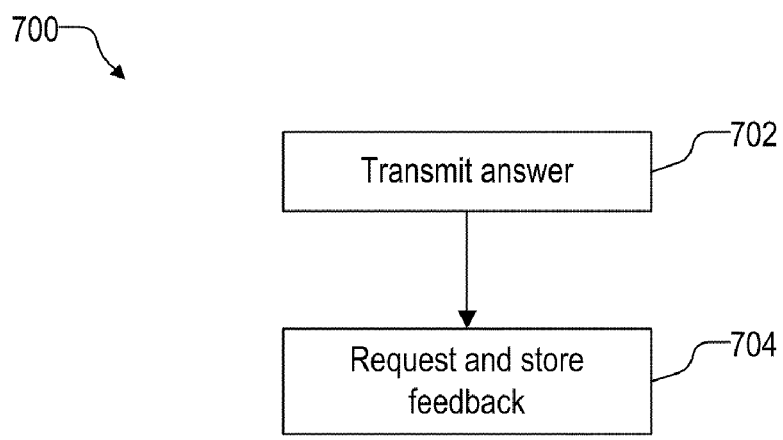
FIG. 7 is a flowchart of a method performed by a presentation module in the Get Engine in one embodiment of the disclosure.

FIG. 7 is a flowchart of a method 700 for presentation module 210 in one embodiment of the disclosure. In step 702, presentation module 210 transmits the answer to the question being asked over computer network 104 to another device. Presentation module 210 may format the answer to fit the screen size of that device. In step 704, presentation module 210 requests feedback value on top ranking the website based on the accuracy of the answer. Presentation module 210 stores the feedback value or an average of the feedback values (e.g., a running average, a moving average, a weighted moving average, or an exponential weight moving average) for the top ranking website in database 214.

FIG. 8 is a block diagram illustrating a computer program product 800 of Get Engine 200 in one embodiment of the disclosure. Computer program product 800 includes instructions 804 of Get Engine 200. Alternatively, computer program product 800 is recorded in computer readable medium 806 or any other recordable medium 808.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to answer a query, comprising:
saving, in a first database, website classifications of websites based on contents;
receiving keywords in the query;
determining query specifications from the keywords, the query specifications being website classifications of websites that may contain an answer to the query;
determining a group of websites based on the query specifications and the website classifications saved in the first database;
selecting a website from the group based on credibility of the websites saved in a second database;
searching web pages of the website for the answer;
selecting the answer from the web pages; and
transmitting the answer.

2. The method of claim 1, wherein the website classifications include at least one classification selected from the group consisting of entity type, service type, information type, sector type, location, and time period.

3. The method of claim 2, wherein the website classifications comprise weights assigned to elements in the website classifications.

4. The method of claim 1, wherein said determining specifications of the query comprises extracting semantics from the keywords to determine the query.

5. The method of claim 4, wherein said determining specifications of the query further comprises prompting and receiving at least one question type.

6. The method of claim 4, wherein said determining specifications of the query further comprises prompting and receiving the website classification for the query.

7. The method of claim 1, wherein said determining a group of websites that may own an answer to the query comprises creating a list of websites having website classifications that match the query specifications and have weights greater than a threshold.

8. The method of claim 7, wherein said determining a group of websites that may own an answer to the query further comprises reducing the list to a number of websites.

9. The method of claim 8, further comprising assigning the credibility to the websites for providing an answer to the query in the past and adjusting the number of websites according to the credibility of the websites.

10. The method of claim 1, further comprising prompting and receiving feedback on answer accuracy, wherein the credibility of the websites saved in the second database is based on the feedback on answer accuracy.

11. The method of claim 1, wherein the credibility of the websites is based on information closeness, information closeness being determined for a website being based on a past answer determined from the website compared to past answers provided from other websites in response to a past query.

12. The method of claim 11, wherein:
when the past query returns a numerical answer, the method comprises determining the information closeness based on the variance of the past answer of the website from a line of regression determined from the past answers of the other websites; and
when the past query returns a non-numeral answer, the method comprises determining the information closeness based on a syntactic closeness of the past answer of the website from the past answers of the other websites.

13. The method of claim 11, when the past answers of the website and the other websites appear disparate, the method comprises applying cluster analysis to determine information closeness separately for each cluster.

14. The method of claim 1, wherein the credibility of the websites is based on numbers of links from other websites in the group to the websites.

15. The method of claim 1, wherein said searching web pages comprises:
searching the web pages for the keywords; and
finding most relevant web pages based on the keywords.

16. The method of claim 15, wherein said searching web pages further comprises:
determining additional words related to the query;
searching the web pages for the keywords and the additional words; and
finding the most relevant web pages based on the keywords and the additional words.

17. The method of claim 16, wherein said selecting the answer from the web pages comprises:
determining semantics of the answer from the question; and
searching for the answer on the most relevant web pages based on the semantics of the answer.

18. A computer-readable non-transitory storage medium encoded with computer-executable instructions for determining an answer to a query, the instructions comprising:
saving, in a first database, website classifications of websites based on contents;
receiving keywords in the query;
determining query specifications from the keywords, the query specifications being website classifications of websites that may contain an answer to the query;
determining a group of websites based on the query specifications and the website classifications saved in the first database;
selecting a website from the group based on credibility of the websites saved in a second database;
searching web pages of the website for the answer;
selecting the answer from the web pages; and
transmitting the answer.

19. An apparatus for determining an answer to a query, comprising:
a memory, comprising:
a website index database comprising website classifications for websites and weights assigned to the website classifications for the websites; and
a credibility database comprising credibility values for the websites;
a processor configured to:
receiving keywords in the query;
determining query specifications from the keywords, the query specifications being website classifications of websites that may contain an answer to the query;
determining a group of websites based on the query specifications and the website classifications of the websites in the website index database;
selecting a website from the group based on the credibility values of the websites in the credibility database;
searching web pages of the website for the answer;
selecting the answer from the web pages; and
transmitting the answer.

20. The apparatus of claim 19, wherein:
the website classifications include at least one classification type selected from the group consisting of entity type, service type, information type, sector type, location, and time period; and
the credibility values is for a credulity based on at least one of feedback on answer accuracy, information closeness, and a number of links from other websites in the group to the website.

* * * * *

UNITED STATES PATENT AND TRADEMARK OFFICE
CERTIFICATE OF CORRECTION

PATENT NO.         : 8,290,924 B2
APPLICATION NO.    : 12/504684
DATED              : October 16, 2012
INVENTOR(S)        : Rajaram Lalgudi Natarajan Page 1 of 1

It is certified that error appears in the above-identified patent and that said Letters Patent is hereby corrected as shown below:

On the Title Page, Item (12),

Left column, line 2, "RAJARAM" should read --LALGUDI NATARAJAN--.

On the Title Page, Item (75),

Left column, line 6, the Inventor's name reading "Lalgudi Natarajan Rajaram," should read --Rajaram LALGUDI NATARAJAN--.

Signed and Sealed this
Fifteenth Day of April, 2014

Michelle K. Lee
*Deputy Director of the United States Patent and Trademark Office*